United States Patent [19]

DeLuca et al.

[11] Patent Number: 4,851,829

[45] Date of Patent: Jul. 25, 1989

[54] PAGING RECEIVER WITH ALERT INDICATING STATUS OF MEMORY

[75] Inventors: Michael J. DeLuca, Boca Raton; Jeffrey B. Reed, Lake Worth, both of Fla.

[73] Assignee: Motorola, Inc., Schaumburg, Ill.

[21] Appl. No.: 938,093

[22] Filed: Dec. 4, 1986

[51] Int. Cl.[4] .............................................. H04Q 7/00

[52] U.S. Cl. .......................... 340/825.44; 340/825.48

[58] Field of Search ...................... 340/825.44, 825.48, 340/825.5, 825.51, 311.1; 455/38, 31, 228, 343, 185, 186; 379/57, 56; 369/27, 30, 53; 364/900 MS File, 200 MS File

[56] References Cited

U.S. PATENT DOCUMENTS

| | | | |
|---|---|---|---|
| 4,412,217 | 10/1983 | Willard et al. . | |
| 4,477,808 | 10/1984 | Ichikawa . | |
| 4,521,776 | 6/1985 | Smoot et al. . | |
| 4,639,723 | 1/1987 | Boughton | 340/825.44 |
| 4,682,148 | 7/1987 | Ichikawa et al. | 340/825.44 |
| 4,701,943 | 10/1987 | Davis et al. | 340/825.44 |
| 4,769,642 | 9/1988 | Davis et al. | 340/825.44 |

FOREIGN PATENT DOCUMENTS

| | | | |
|---|---|---|---|
| 0110506 | 6/1984 | European Pat. Off. | 340/311.1 |
| 2149164 | 6/1985 | United Kingdom | 340/825.44 |
| 2168516 | 6/1986 | United Kingdom | 340/825.44 |

OTHER PUBLICATIONS

"PMR 2000" Series Alphanumeric Display Radio Pager Operating Instructions, 68P81048C90-O, Motorola, Inc., 1986.

"Optrx" Series Alphanumeric Display Radio Pager Operating Instructions, 68P81025C45-C, Motorola, Inc., 1986.

*Primary Examiner*—Donald J. Yusko
*Assistant Examiner*—Edwin C. Holloway, III
*Attorney, Agent, or Firm*—Michael J. DeLuca; Vincent B. Ingrassia

[57] ABSTRACT

The present invention relates to a paging receiver and a method for generating an alert indicating the status of memory. The paging receiver includes a plurality of memory storage areas, each memory storage storing a received message and including a corresponding value indicative of the status of the stored messages. The status values are priority ordered. The number of memory storage areas having status values not exceeding a first predetermined value is determined. If the number determined is below a second predetermined value, an alert is generated.

18 Claims, 10 Drawing Sheets

| INDICATOR \ ACTION ROUTINE | INITIALIZATION | MESSAGE STORAGE | MESSAGE READ | MESSAGE PROTECT | MESSAGE DELETE |
|---|---|---|---|---|---|
| FULL | CLEAR | SET | | | CLEAR |
| READ | CLEAR | CLEAR | SET | | |
| PROTECT | CLEAR | | | SET<br>CLEAR | CLEAR |

PAGING RECEIVER WITH ALERT INDICATING STATUS OF MEMORY

BACKGROUND OF THE INVENTION

1. Field of the Invention

The present invention relates to communications systems and more particularly to a communication system capable of transmitting data messages and for receiving and storing data messages in a communication receiver.

2. Background Discussion

Communication systems in general and paging systems in particular using transmitted call signals have attained widespread use for calling selected receivers to transmit information from a base station transmitter to the receivers. Modern paging receivers have achieved multifunction capability through the use of microcomputers which allow the paging receiver to respond to information having various combinations of tone, tone and voice, or data messages. The information is transmitted using any number of paging coding schemes and message formats. The prior art paging receivers have also provided such features as storing the data messages in a memory of the paging receiver for allowing the user to recall the messages at a later time. Other features have been the ability of paging receivers to provide a visual indication to the user of the receipt of a message, the ability to store the messages to be read at a later time, and the number of messages which have been received.

A typical memory display pager stores a plurality of received messages in a memory of the paging receiver. In the operation of such paging receivers, important factors involved in their successful operation is the portability of the receiver, the limited energy available for storing the messages and for the receiver, the amount of memory available for the paging receiver's processing unit, the limited availability of the radio spectrum, the fast response time required in today's active society, and the number of paging receivers included in a paging system. In such paging receivers, in order that the drain on the battery may be minimized, the paging receiver is systematically turned off and on to maximize the length of time energy is available from the batteries. Limited energy in which the paging receiver must operate limits the memory and minimizes the electronic circuitry such as the memory in the paging receiver. In the case of sending data messages, the data messages are limited because of the limited amount of memory available for operation of the paging receiver. Within these constraints, a paging receiver must commercially operate.

A particular problem with the prior art paging receivers is the situation in which the paging receiver's memory is full and a message received or previously stored is lost because of the lack of memory available to store the message. Therefore, it would be highly desirable to have a paging receiver which alerts the user of the impending destruction or loss of data message.

SUMMARY OF THE INVENTION

The present invention has been developed for the purpose of providing an alert for a user for the impending destruction of a data message in a communication receiver such as a paging receiver. Accordingly, the invention has as its object a method and a device for alerting the user of the impending destruction of a data message.

It is another object of the present invention to provide a method for determining the ability of the paging receiver to store an incoming data message.

It is another object of the present invention to provide an alert for a user to indicate that an unread message may be destroyed or lost before actual destruction of the message.

It is another object of the present invention to provide a method for a communication receiver to control the destruction of a message according to a given priority order.

These, as well as other objects and advantageous features of the present invention, will be in part apparent and in part pointed hereinafter.

In general, a communication receiver for receiving information includes a receiving means, such as a paging receiver, a decoding means, a controlling means, a displaying means, and an alerting means. The receiving and decoding means receives information signals, including at least one message, and decodes the information signals for acquiring the data message. The memory means includes a plurality of memory storage areas or locations, each memory location storing a corresponding received message and including a value indicative of the status of the stored message. The controlling means determines the number of memory locations having a status value not exceeding a first predetermined value, and generates an alert when the number of memory locations having a status value not exceeding a first predetermined value is below a second predetermined value.

In another form of the invention, the status values include a protected status in which the data message cannot be destroyed, an unread status in which the status indicates that the user has not read the message, a read status in which the status indicates that the user has read the message, and finally, an empty status in which no message is included in the message location. The status values are ordered in a predetermined priority so that lower priority status messages are destroyed by an incoming message before higher priority status messages.

In particular, a protected status message being the highest priority cannot be destroyed unless the status is changed to a lower priority message. An unread message cannot be destroyed unless there are the same or higher priority messages remaining. A read message cannot be destroyed unless there are the same or higher priority messages remaining. An empty status message is the first message location for storing an incoming message.

BRIEF DESCRIPTION OF THE DRAWINGS

For the purpose of illustrating the invention, there is shown in the drawings an embodiment which is presently preferred, it being understood, however, that the invention is not limited to the precise arrangement and instrumentality shown.

DETAILED DESCRIPTION OF AN ILLUSTRATED EMBODIMENT

I. General Description

In order to best illustrate the utility of the present invention, it is described in conjunction with a communication receiver such as a paging receiver capable of receiving and decoding encoded information, the encoded information including at least one data message. While the present invention is described hereinafter with particular reference to the paging receiver, it is to be understood at the outset of the description which follows, it is contemplated that the apparatus and methods in accordance with the present invention may be used with numerous other communication receivers.

The paging receiver described herein is associated with a paging system having a base station terminal, responds to control and data information from the base station terminal and in turn stores and provides data messages to a user during operation. With reference to the drawings in general, there is illustrated a paging receiver 10 and a method in one form of the invention of alerting a user of the impending destruction of a message having a distinct status, such as an unread message. The method of the present invention includes a method for indicating the availability of storing data messages in a plurality of memory locations in a communication receiver such as a paging receiver, each of the memory locations being accessible, depending upon a status of a message included within the memory location. The number of inaccessible memory locations being determined and compared to the total number of memory locations of the paging receiver for generating a number of available memory locations. An alert is generated to indicate that the number of available memory locations is below a predetermined value. Thus, the method warns the user of the impending destruction of a stored message by determining if a memory location is available before an incoming message is received.

II. Paging Receiver

Figure 1:
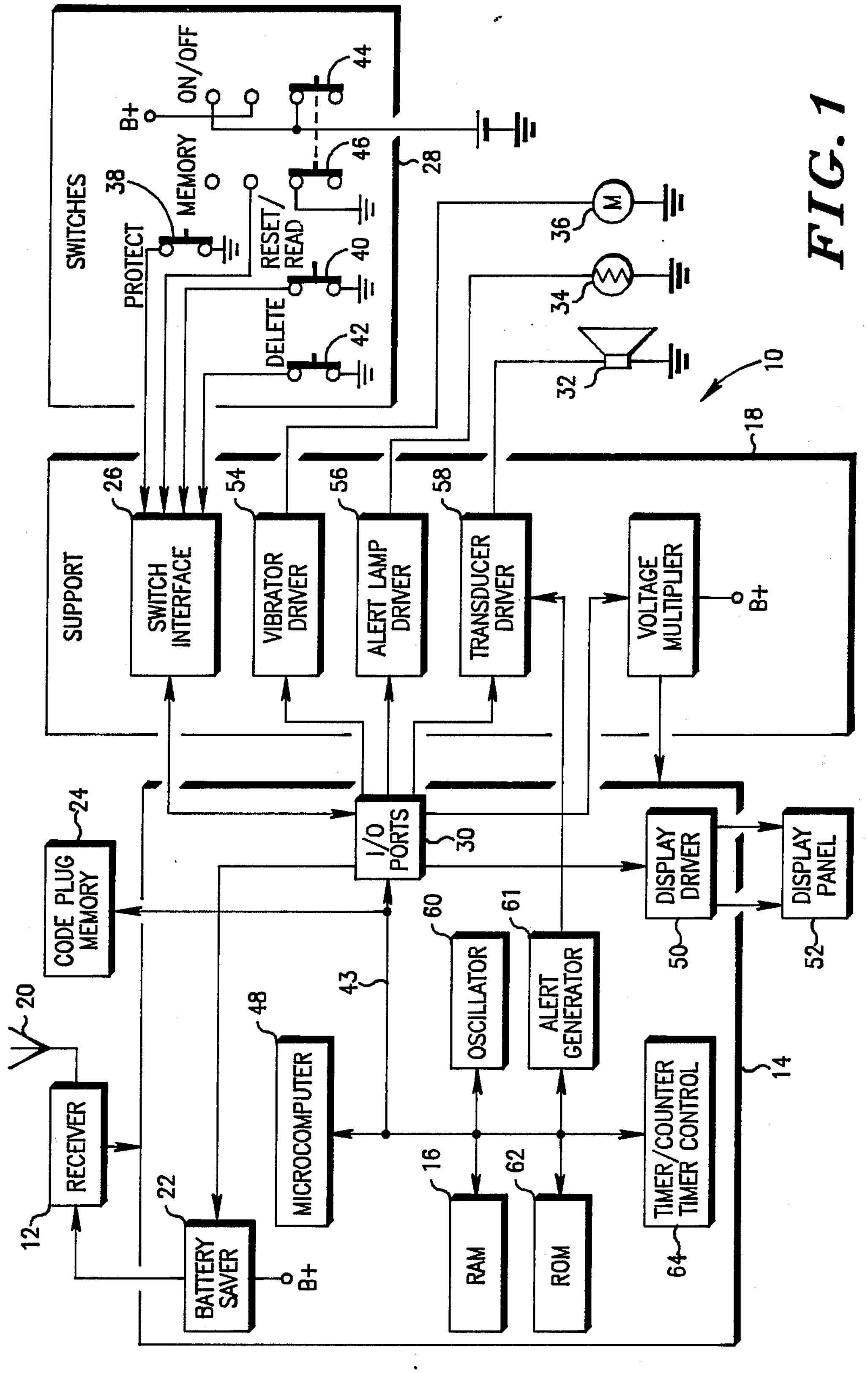
FIG. 1 is a schematic diagram of a typical paging receiver according to the present invention.

More particularly and with specific reference to FIG. 1, there is shown a paging receiver 10 of the present invention including a receiving and decoding means 12, a controlling means 14, a memory means 16, a switching means 28, and alerting means 32–36. In FIG. 1, an antenna 20 receives information such as a paging signal. The antenna 20 is coupled to receiver 12 that is subject to the control of controlling means 14. The controlling means 14 includes a microcomputer 48 that not only controls switching on and off receiver 12, it may also operate receiver 12 on an intermediate basis to extend the life of the batteries through battery saver circuit 22. Receiver 12 outputs to controlling means 14 which has an address decoder for comparing received address words with an address contained in code plug memory 24 to determine if the particular paging receiver has been activated and to prevent the paging receiver from functioning if it has not been activated. Basically, the code plug memory 24 is operatively coupled to the controlling means 14 such that when receiver 12 receives paging codes and corresponding selective calling signals, the controlling means 14 actuates the code plug memory 24 and reads the unique coded contents thereof. If the received paging code matches the unique paging code from code plug memory 24, then the selective calling message associated with the received paging code is stored in memory means 16.

It is noted that the paging receiver of FIG. 1 has the capability of storing selective calling message signals in memory 16 or providing them to support unit 18 or display driver 50 for readout according to the state in which the switches of switching means 28 are set. A switch interface 18 provides I/0 capability between switching means 28 and microcomputer 48. More specifically, the switching means 28 include switches 44–46 for passing alert signals to alert annunciators 32, 34, and 36 and switches 38–42 to control the storage protection and retrieval of messages stored in memory 16.

For example, the protect switch 38 allows the user to select and protect a message location included in memory 16 from being destroyed. Switch 40 allows the user to read a particular memory location in memory means 16. Switch 42 allows the user to delete a message from a memory location included in memory means 16. Switches 44 and 46 allow the user to select one of the alerts 32 through 36 which typically comprise lights, light emitting diodes, speakers, or other annunciators.

Referring to controlling means 14, controlling means 14 includes the microcomputer 48. Microcomputer 48 decodes the address data in a known fashion and compares the results with the predetermined address contained in code plug memory 24 to produce output signals to process the message data, to store the message data, and to alert the user that a message has been received. The microcomputer 48 communicates through bus 43 with other elements of the paging receiver via input/output ports 30. One of the output signals in the microcomputer 48 is supplied to a display driver 50 to produce an alphanumeric display of the data on display panel 52. Other output signals are supplied to a support module 18 to selectively enable a vibrator driver 54, an alert lamp driver 56, or a transducer driver 58. Other signals are applied to battery saver unit 22 and switch interface 26. Microcomputer 48 also controls an alert generator 61 which causes tones produced by transducer driver 58 to be applied to speaker 32.

A clock signal as derived from an oscillator 60 is applied to the microcomputer 48, such as an MC146805L6 microcomputer manufactured by Motorola, Inc., to control the rate at which the signals including the data messages are processed. It is understood that microcomputer 48 uses oscillator 60 as is well known in the art for controlling internal operations as well as its interface with other elements of the paging receiver 10 such as timer control 64. Timer control 64 provides microcomputer 48 time and interrupt information in a manner well known in the art. The microcomputer 48 is coupled by a data bus 43 to a read only memory (ROM) 62 and by data bus 43 to a random access memory (RAM) 16. The RAM 16 includes a plurality of message storage areas and is adapted to store the data messages which microcomputer 48 converts from the received encoded paging information signals and to process these signals including decoding and to appropriately store the data messages in designated memory location areas of RAM 16. The programs or routines to operate microcomputer 48 are stored in ROM 62 and are explained generally with respect to FIGS. 2–13.

In the paging receiver 10, the data messages received and decoded are stored by microcomputer 48 in message storage areas of RAM 16. The messages can be retrieved by the user by notifying microcomputer 48 through the process of activating the read switch 40 to read an appropriate memory storage area to display the message via display driver 50 on display panel 52. Once the message is stored in memory, the paging user may desire to continue such storage and to defer message readout. Alternatively, the user may desire to interrogate memory 16 to determine if any messages have been stored therein while the paging receiver was selected for later readout when so instructed by switches 46 and 44. To initiate such interrogation to read out memory 16, paging user activates switch 40 to cause the microcomputer 48 to read a memory location out of RAM 16. The subsequent activation of read switch 40 causes microcomputer 48 to step through the plural population of memory storage areas displaying their contents. In addition, after reading the data message, the user can either delete the message by activating the delete switch 42 or protect the message from destruction by activating the protect switch 38.

It is noted that the description of the pager operation given above is general in nature. More details of a pager operation are found in U.S. Pat. No. 4,412,217 entitled "Pager With Visible Display Indicating Status of Memory", assigned to the present assignee which disclosure is hereby incorporated by reference.

Associated with a message included in each message storage area is a value representative of the status of the message storage area. For example, in the illustrated embodiment, the status of the message storage area includes a protect status, an unread status, a read status, and an empty status. The protect status identifies the message included as being protected. In terms of a priority order, this status corresponds to the highest priority level. A protected message can be deleted only by user interaction. The microcomputer cannot by definition destroy a protected message. It is important to note that if all message areas are protected, then no incoming message can be saved. To eliminate this problem, it is desirable to insure that at least one message storage area has a lower priority status.

The unread message signifies that a message has been stored but has not been read by the user. The unread message status is the second highest priority. Depending upon the paging system, it may be desirable to destroy a second highest priority message (unread message) to save an incoming message. In this case, it is highly desirable to alert the user that an unread message is going to be destroyed before an incoming message is received. Thus, an alert is generated to notify the user of the impending destruction of an unread message.

The read message status corresponds to the paging user activating the read switch to cause the message to be displayed on display panel 52. In the illustrated embodiment, the read message status has the third highest priority. A read message is replaceable by an incoming message.

The fourth priority level being the lowest priority is the empty status. This corresponds to a message storage area containing no data message. As is evident, an empty message location has the highest priority for storing an incoming message and the lowest priority for being protected.

In general, the paging receiver is designed to control the destruction of a message in a plurality of memory storage locations, each memory storage location associated with a priority level corresponding to a message included in the memory storage area. Before an incoming message is received or after storing a previous incoming message, the priority for each message area is determined. This may be done by reading a value in each storage area or by a memory look up table. Next, the number of messages for each priority level is determined. For example, there may be four messages having a protect status, two messages having an unread status, etc. Then, a priority level is established in which higher priority levels are prevented from being destroyed, while the established priority level and lower can be destroyed. Finally, a priority level is established in which the destruction of any message of that priority level generates an alert. For instance, if an unread message would be destroyed by a new incoming message, an alert is generated. This allows a user the ability to read the unread message before a received incoming message destroys the unread message. It is important to note that the incoming message has a predetermined priority status. For example, in the illustrated embodiment, an incoming message has a predetermined status of unread. Thus, an incoming message has the same priority status as an unread message and therefore will replace an unread message storage area.

III. Software

1. General Description

The following flow charts refer to the operation of microcomputer 48. The programs are stored in ROM 62 in a predetermined sequence to cause the operation of the microcomputer 48 for operating on the data messages to store, display, protect, read, and delete the messages in accordance with the following flow charts. Other routines for the operation of the paging receiver are included in the ROM, however, the routines are not described herein since they are not needed for the understanding of the present invention.

Figure 2:
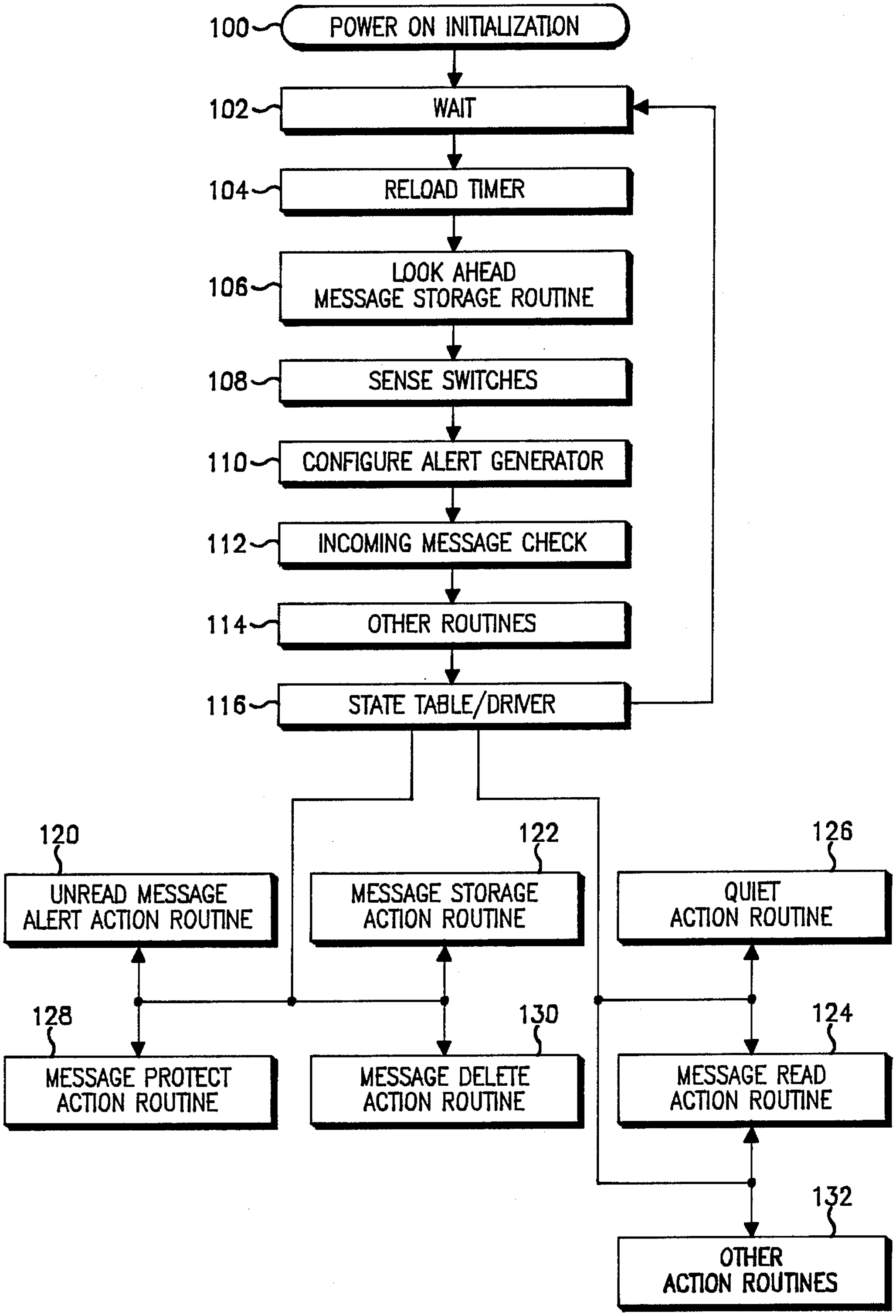
FIG. 2 is a flow chart for explaining the background process of the communication receiver shown in FIG. 1.

The present invention relates to a method for alerting the user of the impending destruction of a message having a predetermined priority level such as an unread message. FIG. 2 illustrates the overall flow diagram of the paging receiver for displaying, deleting, protecting, and saving the data messages in a plurality of message storage areas included in RAM memory 16. The operating software of the paging receiver is separated into foreground and background processes. The foreground process performs functions well known in the art such as decoding data from the receiver and battery saving restructure. The foreground processes are not described herein since they are not needed for the understanding of the present invention. The background process illustrated in FIG. 2 includes those routines for effecting the storing, alerting, deleting, reading, and protecting of decoded data messages.

Initially, the paging receiver is powered up and housekeeping techniques well known in the art are performed to initialize the busses and peripheral equipment connected to the microcomputer 48, step 100. The microcomputer is placed in a condition for the reception of information via the foreground process, step 102. Referring to step 102, when a timer internal to microcomputer 48 counts down to zero, the foreground process is interrupted and the microcomputer is vectored to step 104 of the background process. Typically, these timer interrupts occur once every 77.5 milliseconds and the internal timer is reinitialized in step 104 such that an additional interrupt occurs in another 77.5 milliseconds.

After reloading the timer 104, a look ahead message storage routine is performed to determine if any incoming messages will destroy a predetermined priority level of data messages, step 106. For a better understanding of the configuration and functional cooperation of the software described briefly above, attention is directed to FIG. 5 of the drawings, wherein the look ahead message storage routine is illustrated in detail.

Next, the method senses the activation switches through the switch interface 26, step 108. The switches determine which message storage area to address, display, protect, delete or read. After the switches are sensed, an alert generator routine is entered to generate an alert on the speaker annunciator 32, step 110. The alert generator routine 110 generates a specific series of tones on the speaker annunciator 32. The alert generator routine is not described herein since the routine for generating the tones is well known to those of ordinary skill in the art.

In step 112, the microprocessor checks for the successfully decoding of an incoming message. If an incoming message is detected and successfully decoded, an incoming message indicator such as a flag is set for notifying other routines of the receipt of an incoming message. Other routines such as low battery test and internal housekeeping are then executed in the microprocessor, step 114. The other routines are not described herein since it is not necessary for the understanding of the present invention.

In step 116, a state table driver picks up vectors and indicators from the foreground process, background process, and other processes and appropriately directs the background process to an unread message alert action routine 120, a message storage action routine 122, a message read action routine 124, a quiet action routine 126, a message protect action routine 128, a message delete action routine 130, and other action routines 132. Specifically, the state table driver process queues the routines described above depending upon the indicators and vectors generated by the above mentioned processes. Upon executing all the selected message action routines queued by the state table driver 116, the method then returns from the state table driver 116 to the wait state of the background process and waits for another timer interrupt, step 102. For instance, if the user activates the read switch, the sense switch routine 108 detects the activation which enables the state driver 116 to schedule message read action routine 124.

The flow charts for the message action routines are illustrated in general with respect to FIGS. 9-14. It is to be understood that the above described embodiment of the background process is illustrative only, and that modifications thereof may occur to those skilled in the art, depending upon the particular paging receiver. That is, other message action routines other than routines 120-130 may be included. Accordingly, this invention is not to be regarded as limited to the embodiment disclosed herein, but is to be limited by the appended claims.

2. Power Up Routine

Figures 3, 4:
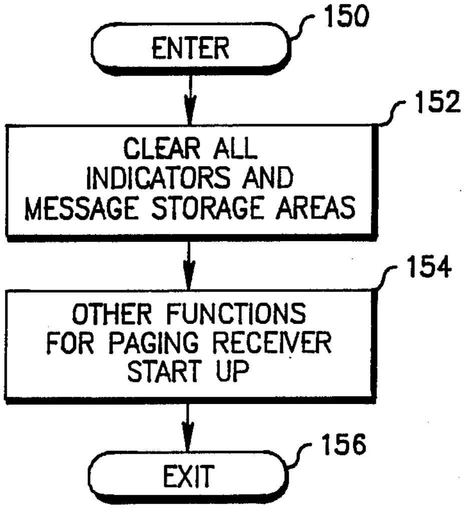
FIG. 3 is a flow chart illustrating the power-on routine for the background process of FIG. 2.
FIG. 4 is a table showing which routines of the background process have access to the message storage indicators.

In FIG. 3, there is shown a flow chart of the power up initialization routine of step 100 in FIG. 2. The power up routine performs start up and housekeeping functions for microprocessor 48. In step 150, the routine is entered by turning on the paging receiver. All appropriate indicators (flags) and message storage areas (locations) are cleared and the processor is put into a state for the subsequent processing of messages, step 152. In step 154, other functions for pager start up and operation are performed such as initialization of constants for the particular paging scheme employed by the pager, etc. The program then exits and the process goes into a wait state as defined by step 102 of FIG. 2.

FIG. 4 shows a table of one illustrative embodiment of the present invention indicating the status of the message storage indicators and the routines which have access to and control the status of the indicators. The left hand column corresponds to three conditions of a message storage area. The full indicator is indicative of the message storage area being occupied by a message. If the full indicator is not set, the message storage area is empty. As is evident, the full indicator determines whether a message storage area is empty or not. The read indicator corresponds to the message storage area containing a message that has been read by the user. If the read indicator is not set and the full indicator is set, then the message storage contains an unread message. The protect indicator corresponds to a message storage area containing a protected message.

The top row corresponds to the message action routines which modify the status of the corresponding indicators. For example, the full indicator is cleared in the initialization routine, set by the message storage action routine, and cleared by the message delete action routine. The read indicator is cleared in the initialization routine, cleared by the message storage action routine and set by the message read action routine. Note that when the user reads a message storage area, the action routine which processes this request sets the read indicator.

The protect indicator is cleared in the initialization routine, set by the message protect action routine, cleared by the message protect action routine, and cleared by the message delete action routine. It is important to note that the user notifies the microprocessor that the message included in a message storage area is to be protected by the activation of the protect switch of the paging receiver. If a message storage area is protected, the activation of the protect switch again causes the protect indicator to be cleared. Thus, the message protect routine sets and clears the protect indicator.

3. Look Ahead Message Storage Routine

Figure 5:
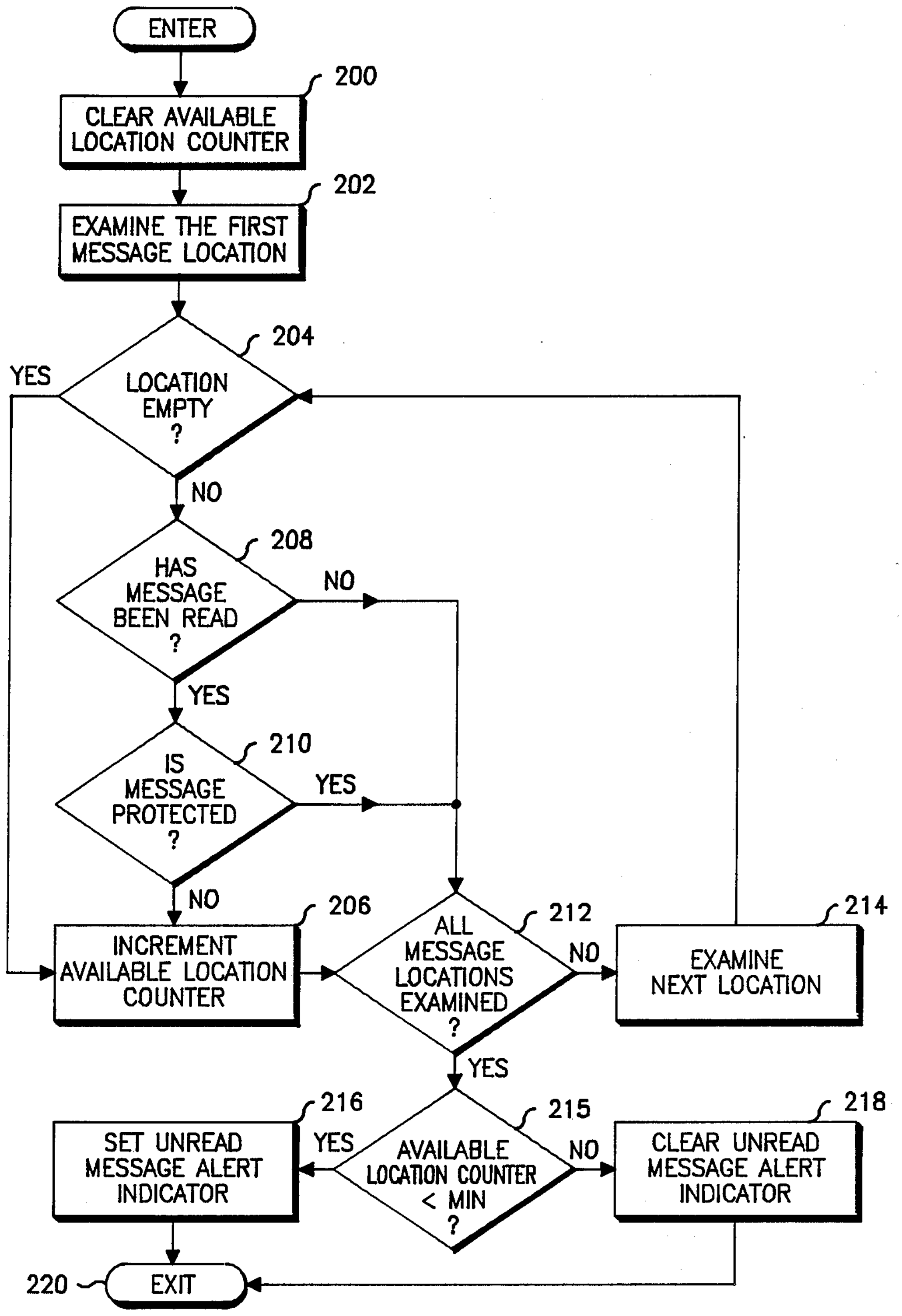
FIG. 5 is a flow chart of the look ahead message storage routine.

FIG. 5 represents a detailed flow chart of the look ahead message storage routine of step 106 of FIG. 2.

One of the functions of the look ahead message routine is to determine the impending destruction of an established priority level of a message such as an unread message. Another objective of the routine is to determine that a low priority message storage area such as an empty message or read message storage area is available for an incoming message.

Another objective is to determine the number of available or accessible storage areas versus inaccessible storage areas depending upon a chosen priority level. The first step is to clear an available location counter, step 200. This step corresponds to resetting the location counter to zero. The location counter counts the number of low priority empty and read message storage areas. The method examines the first message storage area, step 202. The method then determines if the message storage area is empty, step 204. If the message storage area is empty, then the method continues to step 206 and increments the available location counter. Referring back to step 204, if the memory storage area is not empty, it is determined whether the message contained in the message storage area has been read, step 208. If the message storage area has not been read, then the available location counter is not incremented. If the message has been read, then the method determines if the message is protected, step 210.

If the message storage area has been read and is not protected, then the available location counter is incremented, step 206. This corresponds to a message storage area having a nonprotected read message which would be available to be overwritten by a new incoming message. It is important to note that in the priority levels of the illustrated embodiment, all messages except protected messages can be destroyed by an incoming message as defined by message storage action routine 122. If the message storage area is protected, then the available location counter is not incremented and the method proceeds to determine if all the memory locations have been examined, step 212. Referring back to step 208, if the message has not been read, then the method proceeds to bypass the incremented available location counter and proceeds to determine whether all the memory storage areas have been examined, step 212.

In step 212, it is determined whether all the memory storage areas have been examined. If all the memory storage areas have not been examined, the method proceeds to step 214 to examine the next memory storage area and repeats the method beginning with step 204 through step 212. One objective of the steps from 204 to 212 is to determine the number of message locations available for an incoming message. In he priority order of the illustrated embodiment, as described in message storage action routine 122, empty messages, read messages, and unread messages are destroyed in that order by an incoming message while protected messages are saved. For example, if there are eight memory storage areas having two protected messages and two unread messages, then the steps from 204 to step 212 will return a value of four, signifying that four locations are available for storage of an incoming message without destroying an unread message.

The next step in the method is to determine if the available location counter exceeds a predetermined value, step 215. If the available location counter is less than a minimum, the method sets an unread message alert request indicator, step 216. This portion of the method determines that an incoming message will destroy an unread message and an alert request flag will subsequently, as described later in the application, generate an alert signifying that an unread message may be destroyed. Since it is possible to receive more than one message in a short data transmission, the maximum predetermined value can be set to equal the maximum number of messages expected to be received in a very short time or data transmission.

Referring back to step 215 if the available location counter is greater than the minimum, the unread message alert request flag is cleared, step 218. This path corresponds to the operational state of the microcomputer in which there are sufficient available memory locations to appropriately store incoming messages without destroying an unread message. The method then exits to the next background routine, step 220. Basically, this routine schedules an alert indicator for generating an alert when an incoming message will destroy a predetermined priority level such as a message having an unread status. Note that if the alert is generated and the user responds by reading an unread message, the number of available message storage areas increases, causing the alert request indicator to be cleared and terminating the alert.

4. Sense Switch Routine

Figure 6:
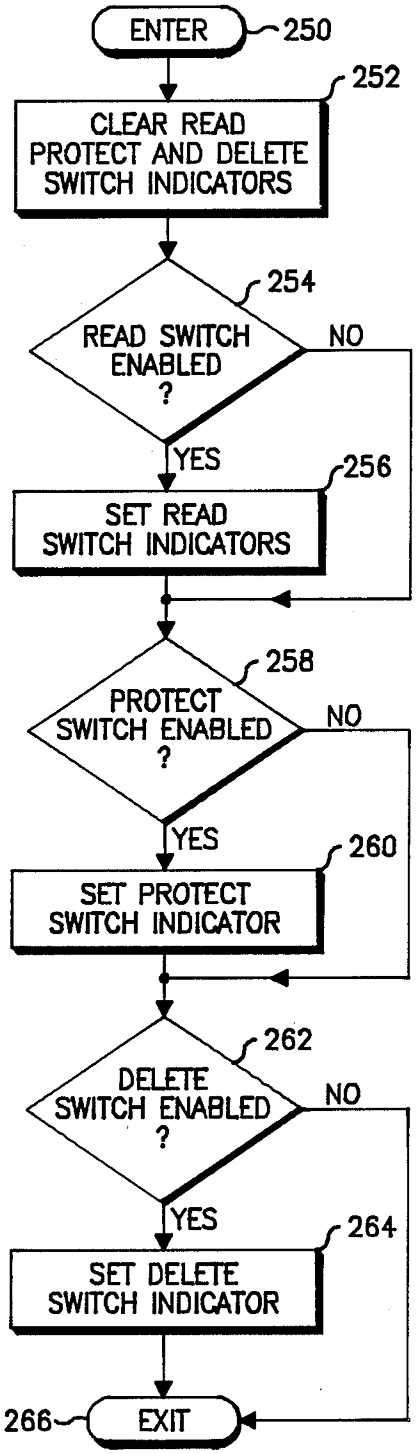
FIG. 6 is a flow chart illustrating the sense switches routine of the background process.

The next background routine is the routine for sensing the switches of the paging receiver. FIG. 6 shows a detailed flow chart illustrating the detection of the activation of the switches of the paging receiver. The procedure is entered in step 250. In step 252, the read switch, protect switch, and delete switch indicators are cleared. The method then determines if the read switch is enabled, step 254. If the read switch is enabled, the read switch indicator is set, step 256. If the read switch is not enabled, the procedure then determines whether the protect switch is enabled, step 258. If the protect switch has been enabled, the protect switch indicator is set, step 260. If the protect switch is not enabled, the procedure does not set the protect switch indicator and continues to step 262. In step 262, the delete switch is sensed. If the delete switch is enabled, the method sets the delete switch indicator, step 264, and then exits, step 266. If the delete switch is not enabled, the method then exits, step 266.

5. Incoming Message Indication Routine

Figure 7:
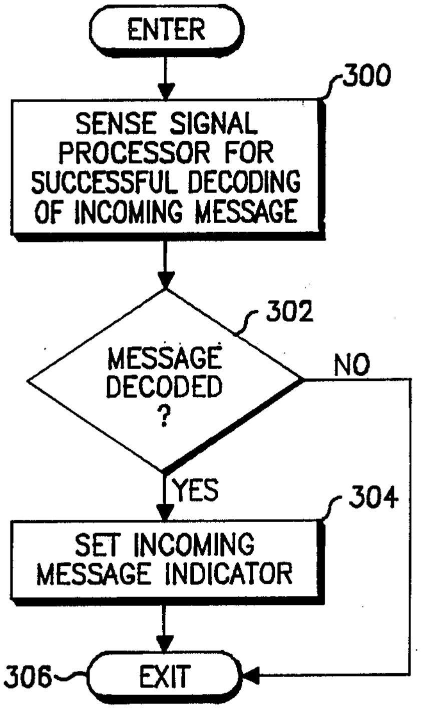
FIG. 7 is a flow chart of the incoming message routine of FIG. 2.

FIG. 7 illustrates a flow chart for step 112 of FIG. 2. The flow chart shows a method for determining if any incoming messages have been received. One objective of the incoming message routine is to provide an indicator to notify the background process that an incoming message has been received, step 300. The method determines if there has been a successful decoding of an incoming message, step 302. The successful decoding of an incoming message is accomplished in the foreground by the microprocessor in a method well known to those of ordinary skill in the art. If the message has been decoded, then an incoming message indicator is set, step 304 and the procedure exits, step 306. Referring to step 302, if a message has not been decoded, then the procedure does not set the incoming message flag and exits, step 306.

6. State Table Driver Routine

Figure 8:
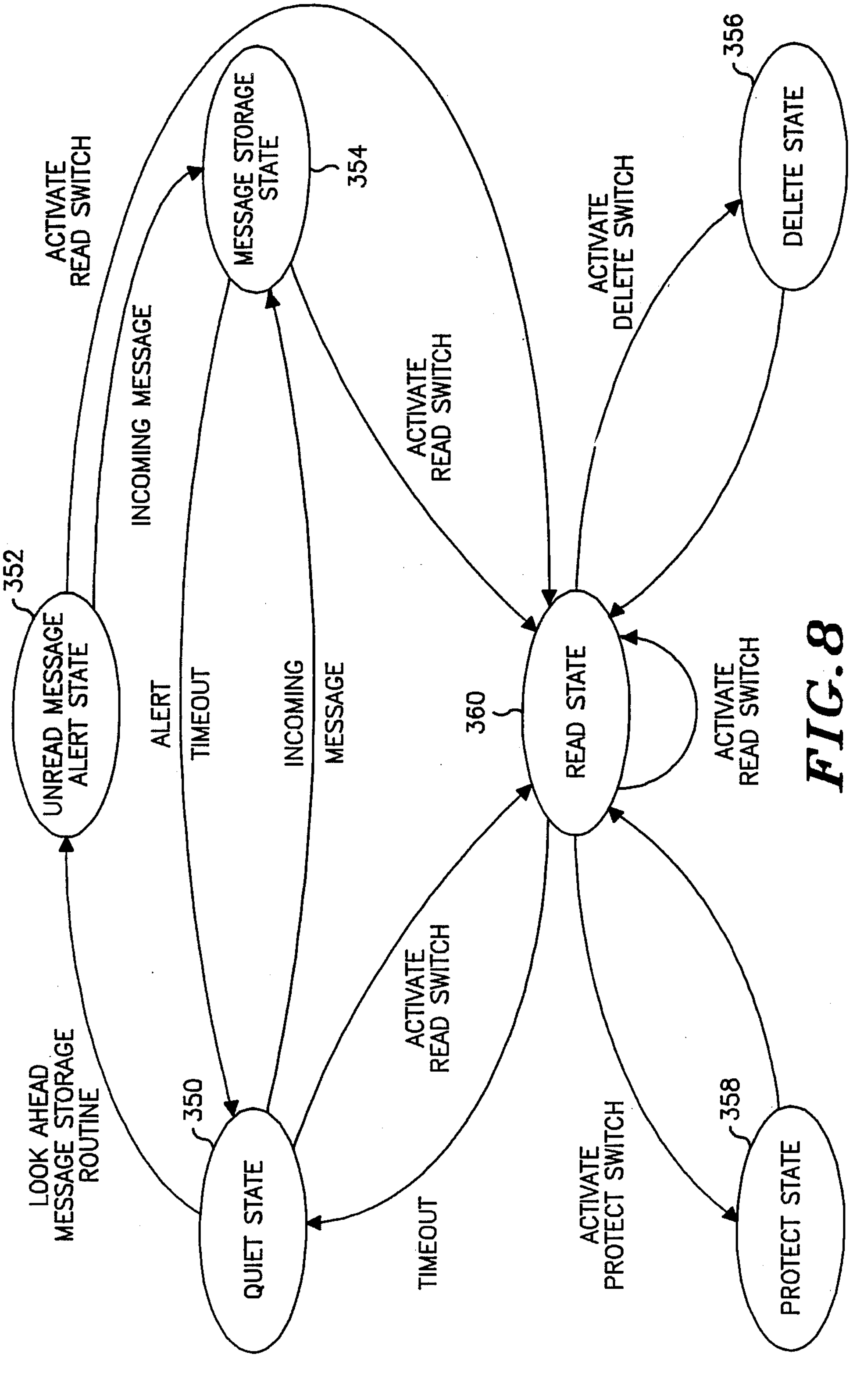
FIG. 8 is a condition transition view for explaining the operation of the communication receiver of FIG. 1.

The next routine in the background processing is the state table driver. The state table driver queues the message action routines, depending upon the indicators as set by the previous background routines. For the sake of clarity, FIG. 8 illustrates a state diagram showing the different states possible for the paging receiver system.

Initially, the system is in a quiet state 350 in which no action is being taken by the state table driver. From the quiet state 350, the state table driver may schedule programs to transfer the system to an unread message alert state 352, a message storage state 354, a read state 360, a delete state 356, or a protect state 358.

The unread message alert state 352 is entered from the quiet state 350 by the look ahead message storage routine as described in FIG. 5. In the unread message alert state 352, the activation of the read switch puts the system in the read state 360. Thus, the user can read an unread message before it is destroyed. Referring back to state 352, if an incoming message is indicated, the unread message alert state is left for the message storage state 354.

The message storage state 354 is also entered from the quiet state 350 by the incoming message routine as described in FIG. 7. Thus, the message storage state 354 is reached from the quiet state 350 or the unread message alert state 352 by a incoming message being received. From the message storage state 354, the system is vectored to the quiet state 350 by an alert timeout. This corresponds to an incoming message alert timing out. That is, on an incoming message, an alert is generated. If no action is taken for a predetermined period of time, the alert times out and the system reverts to the quiet state 350.

The read state 360 is reached from the message storage state 354 by activating the read switch. The read state 360 is the state for reading a message in a message storage area. The read state 360 is also reached from the quiet state 350 by the activation of the read button. To protect a particular message, the protect switch is activated in the read state 360, causing the table driver to vector the system to protect state 358. The message is thus protected. After the message is protected, the system reverts to the read state 360. To delete a message, the delete switch is activated by pressing the delete button and the system is transferred to the delete state 356. After the delete button is released, the system reverts back to the read state 360. The next message storage area is read by activating the read button while in the read state. Hence, the read state is re-entered pointing to the next message storage area. After a predetermined timeout in which no action is taken in the read state 360, the system returns to the normal or quiet state 350 for further action.

As is evident from the state diagram, the state table driver schedules routines to perform the appropriate action to transition the system from one state to another state. For example, from the quiet state 350, if a message is to be deleted, the read button is activated corresponding to a transfer from the quiet state 350 to the read state 360. The delete button is then activated which corresponds to transferring from the read stat 360 to the delete state 356.

7. Message Storage Action Routine

Figure 9:
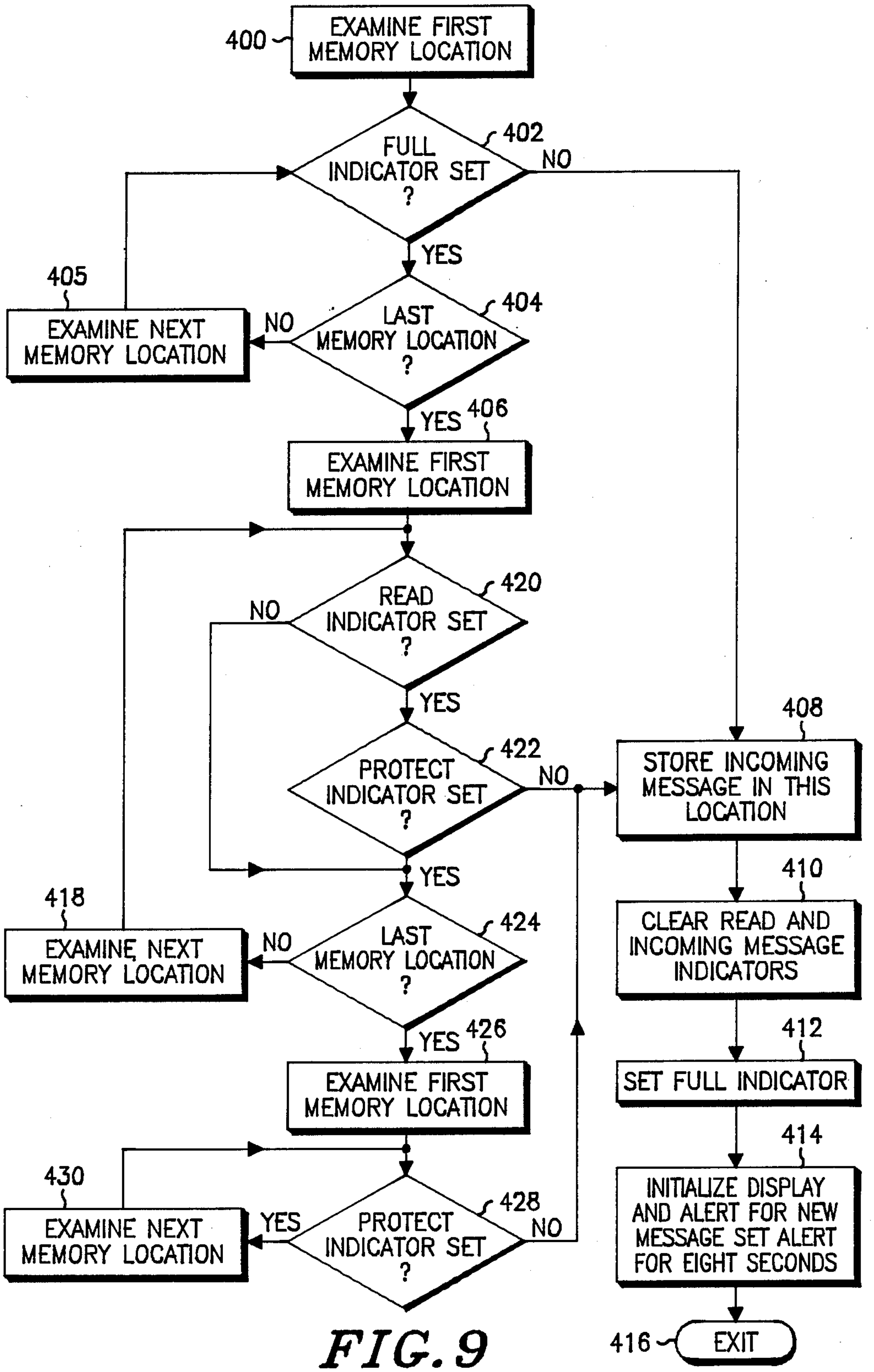
FIG. 9 is a flow chart of the message storage action routine schedule by the state driver of FIG. 2.

FIG. 9 shows the message storage action routine of step 122 of FIG. 2. The message storage action routine determines which message storage areas can be destroyed. In step 400, the first message storage area is examined. If the full indicator is set, a message is included in the message storage area, step 402. If the full indicator is not set, this corresponds to an empty memory storage area and an incoming message is immediately stored in this location, step 408. Referring back to step 402, if the full indicator is set, then it is determined if this is the last memory location, step 404. If this is not the last memory storage area, then the next message storage area is examined, step 405. Steps 402 through 404 are then repeated to determine if there are any empty message storage areas. Eventually, the last message storage area is checked and if no empty memory storage areas are available, the method then determines if there are any read message storage areas available.

In the illustrated embodiment, the priority for the destruction of a message proceeds from the lowest priority for saving of an empty message storage area to the highest priority for saving of a protected message storage area. A protected and unread message storage area cannot be destroyed while a read or empty message storage area exist. It is to be pointed out, however, the priority scheme may easily be modified.

Referring back to step 404, if no empty message storage areas exist, the method then examines again the first message storage area, step 406. The method then determines if the read indicator is set for the message storage area, step 420. If the read indicator is not set (unread message), the method continues to determine if this is the last memory storage area, step 424. If this is not the last memory storage area, the method repeats the above by examining the next message storage area, step 418.

Referring back to step 420, if a read indicator is encountered in any of the message storage areas, the method then proceeds to determine if the protect indicator is set for that memory storage area, step 422. If the protect indicator is set, then the message stored cannot be destroyed and the method continues to determine if this is the last message storage area, step 424. However, if the read indicator has been set in a message storage area and the protect indicator is not set, then the message storage area is a candidate for destruction and a subsequent incoming message can be stored in this storage area, step 408. This corresponds to a message having been read by the user but not being protected by the user.

If the incoming message has not been stored and only protect and unread messages are left, then the method determines if there are any unread messages that can be destroyed, steps 426-430. The method examines the first memory storage area, step 426. The method then determines if the protect indicator is set step 428. If the protect indicator is set, then the next message storage area is examined, step 430. Eventually, if all the message storage areas have protect indicators, then the method cannot store an incoming message. This condition is avoided by preventing the protect indicators for all the memory storage areas from being set as described in FIG. 13. Eventually, an unread memory storage area will be found in which the protect indicator is not set and the method then proceeds to store the incoming message in this storage area, step 408.

After determining a condition (steps 402, 422, or 428) which permits message storage, an incoming message is stored in the corresponding message storage area, step 408. The method then clears the read and incoming message indicators, step 410. The full indicator is set to indicate that the message storage area contains a message, step 412. The display is initialized and an alert is generated for notifying that a new message has been stored, step 414. The alert is generated for a predetermined time period such as eight seconds. The method then exits, step 416.

As is evident, one objective of the message storage action routine is to store an incoming message in a message storage area according to a predetermined priority scheme. In the illustrated embodiment, empty message storage areas are written into first. Read message storage areas are written into second. If no further empty or read message storage areas exist, unread message storage areas are used. Finally, protect message storage areas are never destroyed unless demanded by the user.

8. Unread Message Alert Action Routine

Figure 10:
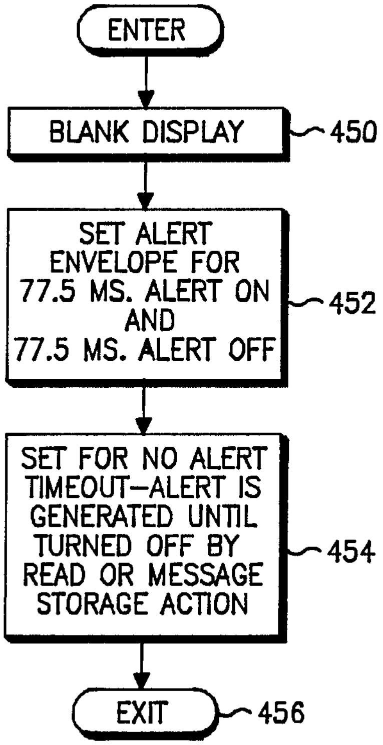
FIG. 10 is a flow chart of the unread message alert routine of the state driver of FIG. 2.

FIG. 10 illustrates a flow chart for the unread message alert action routine of step 120 of FIG. 2. One objective of the routine is to generate an alert for notifying the user of the impending destruction of a message having a predetermined priority level such as an unread message. In step 450, the display is blank. This is a visual indication to notify the user of the impending destruction of an unread message. The method then sets an alert envelope in the alert generator for 77.5 milliseconds alert on and 77.5 milliseconds off, step 452. This corresponds to actually generating an alert tone for 77.5 milliseconds on and 77.5 milliseconds off in the alert generator in a manner well known to those of ordinary skill in the art. In step 451, the alert is generated until turned off by a read action or a message storage action. Other methods of generating an alert can be used, such as flashing a message indicator, upon destruction of a message. The message indicator can be an LED which is well known in the art. The routine then exits, step 456.

9. Quiet Action Routine

Figure 11:
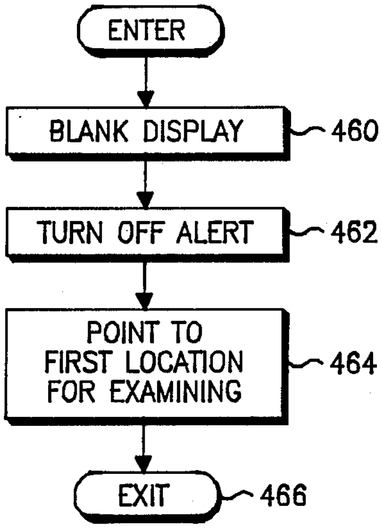
FIG. 11 is a flow chart illustrating the quiet action routine of the state driver of FIG. 2.

FIG. 11 illustrates a flow chart for the quiet action routine of step 126 of FIG. 2. One objective of the quiet action routine is to place the system in a condition for receiving incoming messages, reading messages, protecting messages, etc. In step 460, the display is blank to conserve energy. Any alert is turned off, 462, and a counter pointer is positioned to the first message storage area. The counter steps through each message storage area by the activation of the read switch. The routine then terminates, step 466.

10. Message Read Action Routine

Figure 12:
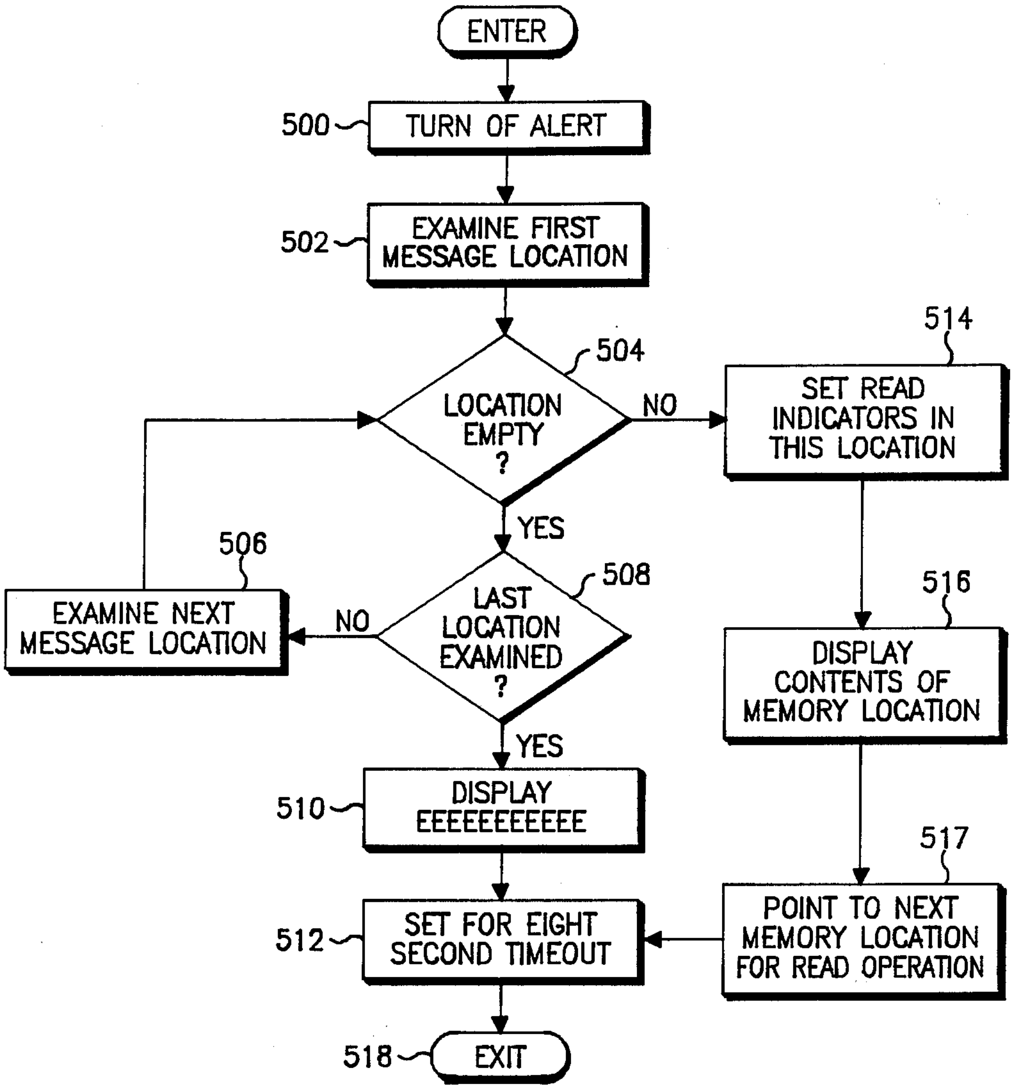
FIG. 12 is a flow chart showing the message read action routine schedule by the state driver to display a message.

FIG. 12 illustrates the message read action routine of step 124 of FIG. 2. The routine begins by turning off any alert, step 500. One objective of the routine is to display a message when the read switch is activated. The first message storage area is examined, step 502. The routine then determines whether the message storage area is empty, step 504. If the message storage area is empty, the routine then determines if all the storage areas have been examined, step 508. If all the message storage areas have not been examined, then the routine examines the next message storage area, step 506. If all the storage areas are empty, then the routine will display a predetermined pattern, such as all E's, on the display panel, step 510. This notifies the user that all the memory storage areas are empty. An eight second timeout is set for returning the system back to the quiet state, step 512. Referring back to step 504, if a location is not empty, then the read indicator is set to this storage area, step 514. The contents of the memory storage area are displayed on the display panel, step 516. The next message storage area is pointed to in case of re-entry into the read state by activating the read button again, step 517. The method then sets the eight second timeout for returning to the quiet state, step 512. The routine then exits, step 518.

11. Message Protect Action Routine

Figure 13:
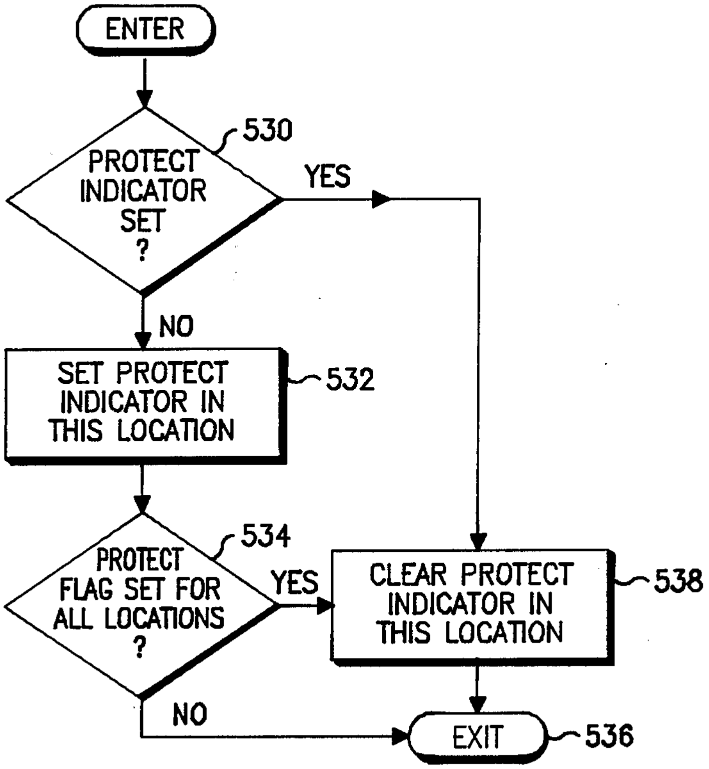
FIG. 13 is a flow chart of the message protect action routine for protecting a message in a memory location.

FIG. 13 illustrates a flow chart for the message protect action routine of step 128 of FIG. 2. One objective of the message protect action routine is to set a protect indicator in a message storage area desired by the user. In step 530, it is determined whether the protect indicator is set in this area. If the protect indicator is set in this location, then the routine clears the protect indicator in this area, step 538. This corresponds to the procedure of unprotecting a protected memory message storage area by pressing the protect switch a second time. Referring back to step 530, if the protect indicator is not set in this storage area, the protect indicator is set, step 532. The routine then determines whether the protect indicator is set for all memory storage areas, step 534. If the protect indicator will be set for all memory storage areas, then a condition may arise where an incoming message cannot be stored. This condition is avoided by preventing the protect indicator from being set for all memory storage areas, step 538. The method proceeds to clear the protect indicator in this area if the setting of this protect indicator causes the protection for all memory storage areas. If the protect indicator does not protect all memory storage areas, then the procedure exits, step 536.

12. Message Delete Action Routine

Figure 14:
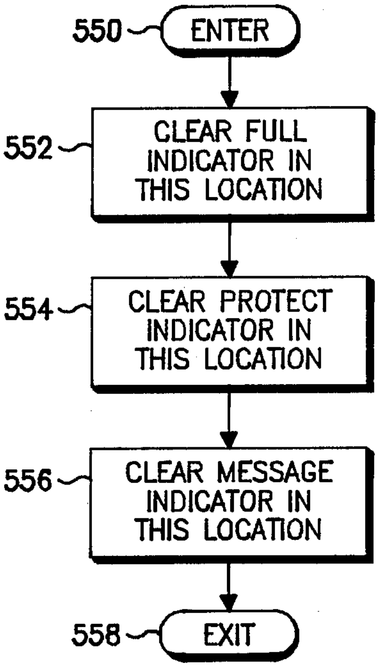
FIG. 14 is a flow chart showing the message delete action routine for deleting a message from a memory location.

FIG. 14 illustrates a flow chart for the message delete action routine of step 130 of FIG. 2. One objective of the message delete action routine is to delete a message in a corresponding message storage area. The routine begins by clearing the full indicator in the selected memory protect location, step 552. The routine then clears any protect indicator in this storage area, step 554. The routine then clears the message from the storage area, step 556, and exits, step 558.

IV. Conclusion

Thus, there has been shown a communication receiver for receiving information including a data message. The communication receiver such as a paging receiver includes a receiving means, a decoding means, a controlling means, a memory means, and an alert means. A memory means includes a plurality of memory storage areas, each memory storage area storing a corresponding incoming message and including a value indicative of the status of an included message. The controlling means, such as a microcomputer, counts the number of memory storage areas having a status value not exceeding a first predetermined value and generates an alert when a number of memory storage areas having a status value not exceeding a first predetermined value is below a second predetermined value. In the illustrated embodiment, each memory storage area is associated with the status values which include a protected status, an unread status, a read status, and an empty status. The method allows an incoming message to replace in priority order an empty message storage area, a read message storage area, and an unread message storage area. The message is placed in an unread message storage area if neither an empty message storage area or a read message storage area is available. A protected memory storage area is never destroyed, but the system is constrained to have at least one message storage area that is unprotected.

The above described embodiment of the invention is illustrative only, and that modifications thereof may occur to those skilled in the art. Accordingly, this invention is not to be regarded as limited to the embodiment disclosed herein, but is to be limited as defined by the appended claims.

What is claimed is:

1. A method for saving messages transmitted to a communicating receiver having a plurality of message storage areas, wherein each storage area being capable of saving a message received by the communication receiver includes a value representative of the status of the message storage area, said method comprising the steps of:

(a) receiving and decoding at the communication receiver encoded information signals, wherein the information signals includes at least one message;
(b) determining the status value for a message storage area;
(c) assigning a decoded message value to the decoded message;
(d) comparing the status value to the decoded message value;
(e) storing the decoded message in the message storage area depending upon the difference between the status value and the decoded message value;
(f) ordering in a predetermined priority the status values, wherein the status values include a protected status, an unread status, a read status, and an empty status, with the protected status being the highest priority and empty status being the lowest priority; and
(g) assigning the decoded message value equal to the unread status value.

2. The method of claim 1 further including the steps of:

(h) repeating step (b) of determining through step (d) of comparing for all the message storage areas; and
(i) generating an alert if there does not exist a status value which permits the decoded message to be stored.

3. The method of claim 1 wherein step (e) of storing further includes storing the decoded message in a message storage area if the decoded message value exceeds the status value for the message storage area.

4. A method for indicating the availability of storing messages in a plurality of message storage areas in a communication receiver, a message storage area being accessible depending upon a status value associated with the message storage area, said method comprising the steps of:

(a) counting the number of inaccessible message storage areas by determining the status value in each of the areas and comprising the status values to a first predetermined status value;
(b) subtracting the number of inaccessible message storage areas from the total number of message storage areas to generate a number of available message storage areas;
(c) comparing the number of available message storage areas to a predetermined number, the predetermined number being less than the total number of message storage areas;
(d) generating an alert signal to indicate that the number of available message storage areas is below the predetermined number; and
(e) terminating the alert signal when the number of available storage areas exceeds the predetermined number.

5. The method of claim 4, further including the step of:

(f) setting the predetermined number approximately equal to the maximum number of messages expected to be received in a predetermined time period.

6. The method of claim 4 wherein the status values of the message storage area comprises a protected status value and unread status value, said method further including the steps of:

(g) counting the number of protected message storage areas; and
(h) preventing the number of protected message storage areas from exceeding a second predetermined number.

7. The method of claim 6 further including the steps of:

(i) receiving and decoding at the communication receiver encoded information signals, wherein the information signals includes at least one message;
(j) storing the message in an available message storage area; and
(k) storing the message in a message storage area having an unread status if no available message storage areas are available.

8. The method of claim 7 further including the steps of:

(1) providing an indicator corresponding to a destruction of an unread message stored in a message storage area; and
(m) energizing the indicator to signal the destruction of the unread message.

9. The method of claim 6 wherein step (g) further includes:

(n) providing an indicator corresponding to a destruction of an unread message stored in a message storage area;
(o) flashing said message indicator to indicate the destruction of the message; and
(p) terminating the flashing of the indicator after the destruction of the message.

10. A method for indicating the availability of storing messages in a plurality of message storage areas in a communication receiver, a message storage area being accessible depending upon a status value associated with the message storage area, said method comprising the steps of:

(a) counting the number of available message storage areas by determining the status value for each message storage area and comparing the status value to a first predetermined status value;
(b) comparing the number of available message storage areas to a predetermined number, the predetermined number being less than the total number of message storage areas;
(c) generating an alert for indicating that the number of available message storage areas is below the predetermined number; and
(d) setting the predetermined number approximately equal to the maximum number of messages expected to be received in a predetermined time period.

11. A communication receiver including a means for decoding received information signals, the information signals including at least one message, said receiver comprising:

a plurality of message storage areas, each message storage area storing a corresponding received message and including a value indicative of the status of the message storage area;
means for assigning a received message a received message value; means for determining the status value for each message storage area and comparing the received message value to the status value; and
means for storing a received message in a message storage area based upon the difference between the status value and the value assigned to the received message, wherein the status values include a protected status, an unread status, a read status, and an empty status, ordered in a predetermined priority with the protected status being the highest priority and the empty status being the lowest priority, and further wherein the received message value is assigned one of the status values.

12. The communication receiver of claim 11, wherein the received message value is assigned the unread status value.

13. A communicating receiver including a means for decoding received information signals, the information signals including at least one message, said communication receiver comprising:

a plurality of message storage areas, each message storage area storing a corresponding received message and including a value indicative of the status of the message storage area;

means for counting the number of message storage areas having a status value not exceeding a first predetermined status value; and means for generating an alert when the number of message storage areas having a status value not exceeding the first predetermined status value is below a predetermined number, the predetermined number being less than the total number of message storage areas, wherein the status values include a protected status, an unread status, a read status, and an empty status ordered in a predetermined priority with the protected status being the highest priority and the empty status being the lowest priority.

14. The communication receiver of claim 13, wherein the first predetermined value is set to the unread status value.

15. A method for controlling the destruction of a message in a paging receiver having a plurality of message storage areas for storing messages, said method comprising the steps of:

(a) establishing a priority order for saving messages in the plurality of message storage areas, wherein the order priority includes a protect status, an unread status, a read status and an empty status, and further wherein the protect status is equivalent to the highest priority and the empty status is equivalent to the lowest priority;

(b) determining the priority for each message storage area;

(c) establishing a first priority level for storing messages in a message storage area when said first level is an equivalent or higher priority than the priority of said storage area, causing the destruction of a previously stored message in said storage area;

(d) determining the number of message storage areas with equivalent or higher priorities than the first priority level; and (e) generating an alert when said determined number of message storage areas of step (e) is equal to a predetermined number.

16. The method of claim 15, further including the step of setting the protect status to the first priority level.

17. The method of claim 15, wherein the predetermined number is equal to or less less than the total number of message storage areas.

18. The method of claim 15, wherein step (e) of generating further includes generating the alert before destruction of a stored message.

* * * * *